(12) United States Patent
Waddell et al.

(10) Patent No.: US 7,687,968 B2
(45) Date of Patent: Mar. 30, 2010

(54) HIGH SPEED GENERATOR ROTOR DESIGN INCORPORATING POSITIVELY RESTRAINED BALANCE RINGS

(75) Inventors: Simon L. Waddell, Tucson, AZ (US); Gregor McDowall, Phoenix, AZ (US); William M. Scherzinger, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 269 days.

(21) Appl. No.: 11/744,628

(22) Filed: May 4, 2007

(65) Prior Publication Data

US 2008/0272671 A1 Nov. 6, 2008

(51) Int. Cl.
*H02K 5/24* (2006.01)
(52) U.S. Cl. .......................... 310/261; 310/51
(58) Field of Classification Search .................. 310/51, 310/261, 260
See application file for complete search history.

(56) References Cited

U.S. PATENT DOCUMENTS

| 2,249,834 | A | | 7/1941 | Kreh, Jr. |
| 4,564,777 | A | | 1/1986 | Senoo et al. |
| 5,122,696 | A | * | 6/1992 | Shih et al. ..................... 310/71 |
| 5,894,183 | A | * | 4/1999 | Borchert ..................... 310/261 |
| 6,753,637 | B2 | * | 6/2004 | Tornquist et al. ............ 310/261 |

FOREIGN PATENT DOCUMENTS

| EP | 0341317 A | 11/1989 |
| EP | 0911537 A | 4/1999 |
| JP | 56110465 A | 9/1981 |
| JP | 59103551 A | 6/1984 |
| JP | 60051440 A | 3/1985 |
| JP | 61266053 A | 11/1986 |
| JP | 5316672 A | 11/1993 |

OTHER PUBLICATIONS

European Search Report dated Nov. 19, 2008.

* cited by examiner

*Primary Examiner*—Dang D Le
(74) *Attorney, Agent, or Firm*—Oral Caglar, Esq.

(57) ABSTRACT

A generator may incorporate a positively restrained balance ring. A generator may include a rotor core including a rotor, and a balance ring. The balance ring may include a weight. The balancer may include a plurality of balance holes in the ring, at least one of the plurality of balance holes to receive a weighted insert. A method of balancing a rotor of a generator may include mounting a balance ring adjacent to a rotor core, and adjusting weights to be located at one or more of a plurality of positions equally spaced around the balance ring to balance the rotor.

17 Claims, 7 Drawing Sheets

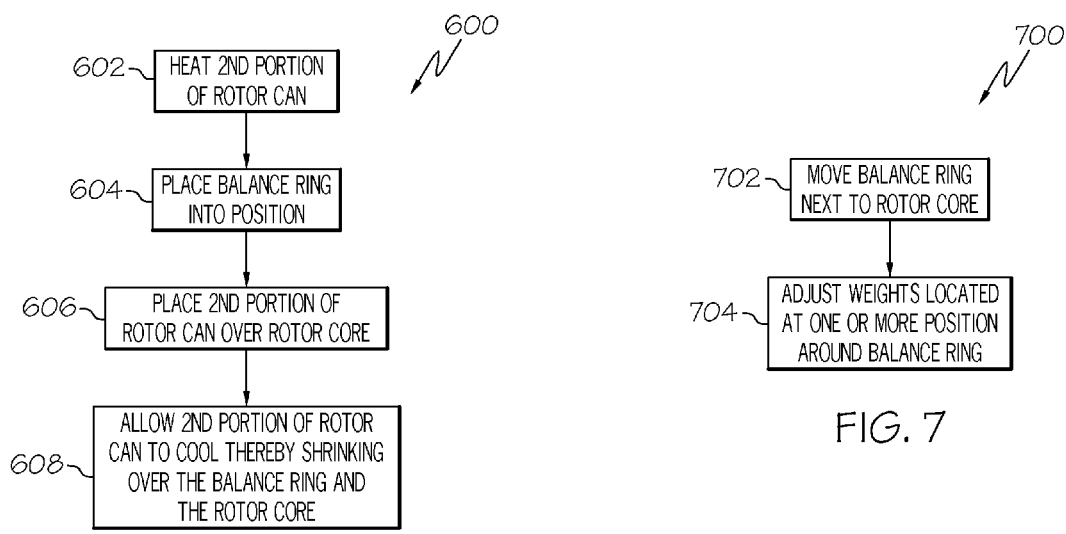

HIGH SPEED GENERATOR ROTOR DESIGN INCORPORATING POSITIVELY RESTRAINED BALANCE RINGS

BACKGROUND OF THE INVENTION

Embodiments of the present invention relate generally to generators and, more particularly, to high speed generators incorporating positively restrained balance rings.

There is a trend of utilizing more and more electric systems in vehicles such as aircraft. This is due in part to a change over from traditionally non-electric systems, such as hydraulic systems, to electric systems. This trend is also due to the creation of entirely new electric systems that did not exist in the past. Examples include replacing hydraulic actuators with electric motors and the removal of bleed air from cabin pressurization. Consequently, demand for electric power in vehicles continues to increase.

Typically, electric power is generated in a vehicle by one or more electric generators. Due to the increasing power requirements, generators are being run at higher speeds. Such generators may be referred to as "high-speed" generators. Conventional high-speed generators may include, among other elements, a rotor, a shaft, a rotor band at each end of the rotor, coils, coil end turns, interpole wedges, and band supports.

Rotation, such as the rotation of a rotor in a high-speed generator, exerts forces on the elements of the generator. Accordingly, a rotor band is typically placed around the coil end turns. Specifically, band supports are glued or bonded to the coil end turns and the interpole wedges are inserted in between the coils. The rotor band is placed around the band supports and the interpole wedges so as to keep these component parts secure relative to one another and relative to the rotor. As the rotor band, the interpole wedges, and the band supports are all individual pieces, manufacture and maintenance may be complex.

As a revolving part, a rotor may need to be balanced. Conventionally, the rotation of a rotor would be balanced by adding weights at particular locations on a geometric plane referred to as a balance plane. Conceptually, the balance plane may be thought of as extending along x and y axes, while a shaft of a generator may be thought of as extending along the z axis. The rotation of the rotor is around the z axis. By placing weights at particular locations on the balance plane, any rotor unbalance caused during assembly can be reduced to acceptable levels.

In a typical generator, rotor band supports may be used in combination with weights. The band supports are typically shaped pieces of aluminum, flat on the bottom and curved on the outer surface. The balance supports are placed on the top of each end turn and a ring is placed over the balance support/end turn assembly to provide restraint against the radial forces. By placing particular amounts of weight within the band supports, the rotor may be balanced. As noted above, the band supports are individual from one another and from the rotor band and the interpole wedges. Accordingly, the band supports and the interpole wedges may shift or change position relative to one another, even if only so slightly. For example, one band support may shift position relative to another band support as a result of the differing strength of the adhesive bonds created during the epoxy impregnation process. This may not be apparent at the relatively low speeds the rotor is balanced at. At a high rate of speed, such position changes can result in an unbalanced rotor. Further, the band supports do not extend the entire way around the rotor. Weights can only be added to the band supports. Thus, "dead spots" exist where it may be impossible to add balance weights over the complete 360 degrees of the balance plane.

As can be seen, there is a need for a high speed generator improving upon the conventional rotor band, the conventional interpole wedges, the conventional band supports, and the conventional weights. There is also a need for a high speed generator having fewer dead spots on the balance plane. Further, there is a need for a high speed generator that is relatively simple to manufacture and that is relatively simple to maintain once in use.

SUMMARY OF THE INVENTION

In one aspect of the present invention, a generator may include a rotor core including a rotor, and a balance ring. The ring may include a weight.

In another aspect of the present invention, a generator may include a rotor core including a rotor, a balance ring adjacent to the rotor core, the ring including a plurality of balance holes, at least one of the balance holes to receive a balance weight to balance the rotation of the rotor, and a rotor can over the rotor core and the ring.

In still another aspect of the present invention, a method of balancing a rotor of a generator may include mounting a balance ring adjacent to a rotor core, and adjusting weights to be located at positions equally spaced around the balance ring to balance the rotor.

These and other features, aspects and advantages of the present invention will become better understood with reference to the following drawings, description and claims.

BRIEF DESCRIPTION OF THE DRAWINGS

FIG. 6 is a schematic representation of a process of fabricating a rotor of a generator, such as the generator of FIG. 1A, according to an embodiment of the present invention.

FIG. 7 is a schematic representation of a process of balancing a rotor of a generator, such as the rotor of FIG. 1A, according to an embodiment of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention may include a balance ring that may be used in an electric generator. Embodiments of the present invention may include a rotor can (or sleeve) over a rotor core and extending beyond the end of the rotor core. The balance ring may function as a rotor band and as rotor band supports providing radial support for coil end turns. The balance ring may include a series of holes (or balancer) to balance a rotor of the generator. The balance ring may be located within a portion of the rotor can extending beyond the end of the rotor core. Thereby, the balance ring may be positively restrained in the rotor can. Embodiments may be useful in a variety of applications, including in generators in gas turbine engines, such as those found in aircraft, ships, and some terrestrial vehicles.

Embodiments of the present invention may differ from conventional rotor band configuration prior art generators that include sleeves at least by providing a rotor can (or sleeve) over a rotor core that extends beyond the end of the rotor core to secure a balance ring. Embodiments of the present invention may differ from single rotor can prior art generators at least by providing a two piece rotor can. Embodiments of the present invention may differ from prior art generators having multiple band supports supporting coil end turns at least by providing a complete balance ring supporting coil end turns. Embodiments of the present invention may differ from prior art generators having band supports capable of receiving weights at least by providing a balance ring including a balancer to balance a rotor of the generator by receiving weights at particular locations along a balance plane. Embodiments of the present invention may differ from prior art generators having movable components that may move away from the center of rotation in a non uniform manor by providing a balance ring having a center line that may remain in line with the center of rotation of a rotor of the generator.

Figure 1A:
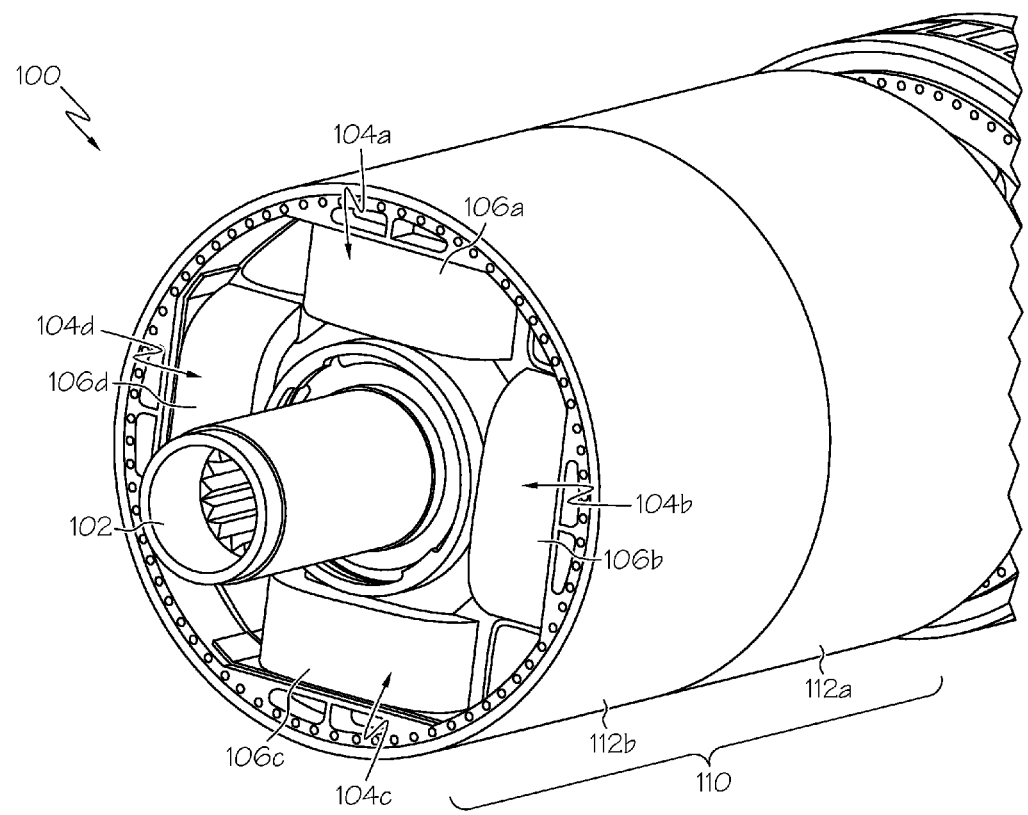
FIG. 1A is a perspective view of a rotor according to an embodiment of the present invention.
Figure 1B:
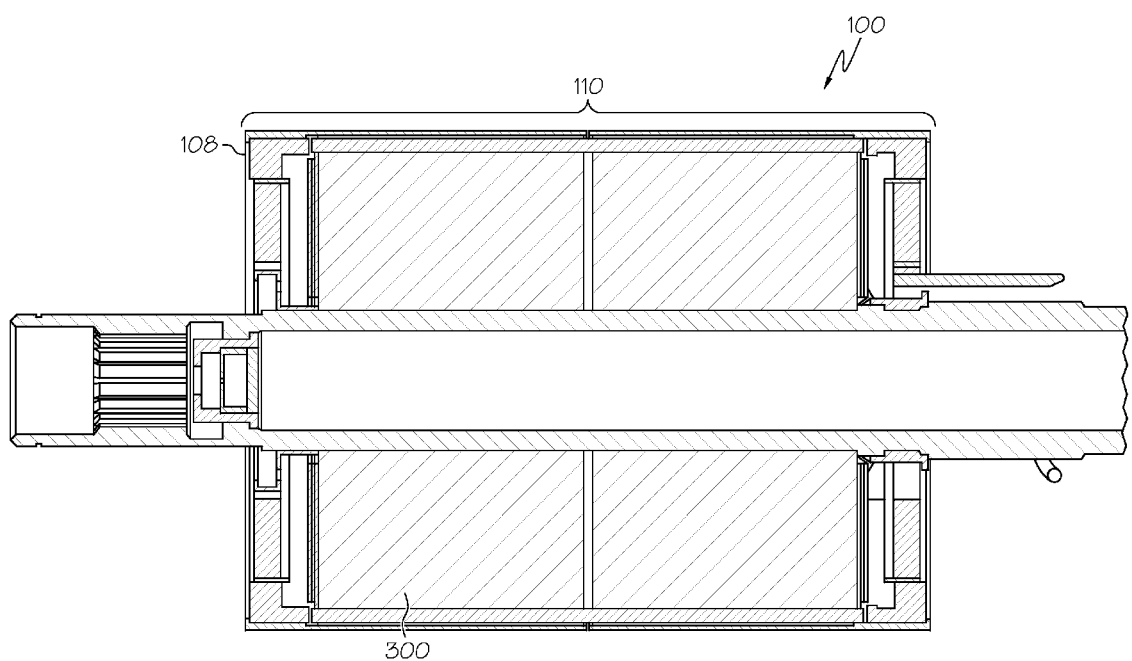
FIG. 1B is a perspective cross sectional view of the rotor of FIG. 1A.
Figure 3:
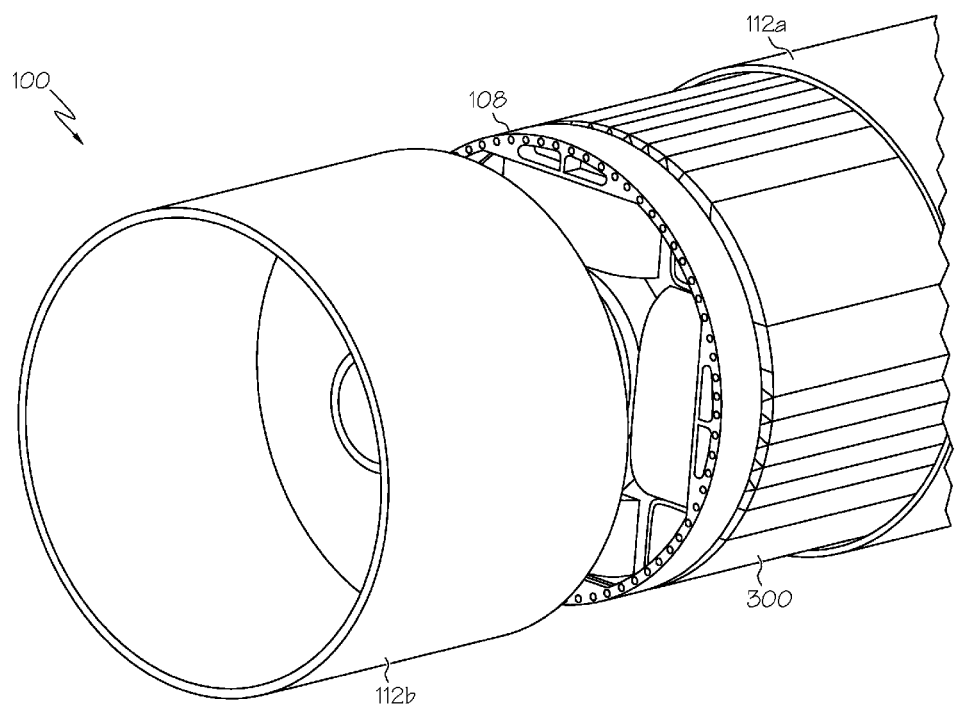
FIG. 3 is a partially exploded view of the rotor of FIG. 1A, the second portion of the rotor can being shown as exploded away from the first portion of the rotor can.

FIG. 1A is a perspective view of a rotor 100 according to an embodiment of the present invention. FIG. 1B is a perspective cross sectional view of the rotor 100 of FIG. 1A. The rotor 100 may include a shaft 102 and coils 104a-d, both running lengthwise through the rotor 100. The coils 104a-d may be arranged around the shaft 102 thereby at least partially encasing the shaft 102. The shaft 102 and coils 104a-d may form a part of a rotor core 300 (FIG. 3).

The rotor 100 of FIG. 1A may comprise four poles. However, in an alternative embodiment, a rotor may include a different number of poles. For example, a rotor may include two poles, six poles, or any other appropriate number of poles.

A rotor can 110 may wrap around at least a portion of the rotor core 300. The rotor can 110 may be held in place by interference fit directly over the rotor core 300. In an embodiment, the rotor can 110 may be placed over the rotor core 300 by heating the rotor can 110 and then placing the rotor can 110 over the rotor core 300 while still hot. As the rotor can 110 cools, it may shrink thus resulting in an interference fit. For example and not by way of limitation, an interference fit of approximately 0.010" may result. As shown in FIG. 1B, the rotor can 110 may extend beyond the end of the rotor core 300.

In this embodiment, the rotor can 110 may have a first portion 112a and a second portion 112b. By using a two piece rotor can 110 design, manufacturing of the rotor may be simplified. For example, it may be easier to heat one portion of the rotor can 110 and place it over the rotor core 300 and then heat a second portion of the rotor can 110 that may contain the balance ring 108 and may slide over only part of the rotor core 300. Further, as discussed below, a two piece design may allow for securing a balance ring 108 against the rotor core 300.

In the present embodiment, the rotor can 110 may be formed of Inconel® 718 (a registered trademark of Special Metals Corporation, Huntington, W. Va.); however, other non-magnetic materials such as a composite material may be used. For example, a carbon fiber composite may be appropriate.

The rotor 100 may further comprise end turns 106a-d located at the ends of the coils 104a-d. The end turns 106a-d may protrude from the end of the rotor core 300.

The rotor 100 may further comprise a balance ring 108. If the second portion 112b of the rotor can 110 extends beyond the end of the rotor core 300, the second portion 112b may secure the balance ring 108 by preventing radial movement of the balance ring 108. The second portion 112b of the rotor can 110 may hold the balance ring 108 in place by interference fit. In an embodiment, the second portion 112b of the rotor can 110 may be placed over the balance ring 108 by heating the second portion of the rotor can 110 and then placing the second portion 112b of the rotor can 110 over the balance ring 108 while still hot. As the second portion 112b of the rotor can 110 cools, it may shrink thus resulting in an interference fit to the balance ring 108. Thus, the balance ring may be positively restrained. The rotor can may contain at the outboard end, a lip that may further restrain the balance ring in the axial direction. In an embodiment, the first portion 112a of the rotor can 110 may be similarly constructed to secure a second balance ring.

The balance ring 108 may be adjacent to the rotor core 300 and arranged around the coil end turns 106a-d. As such, the balance ring 108 may provide radial support for the coil end turns 106a-d. Additionally, as discussed below, the balance ring 108 may includes a plurality of holes arranged over 360 degrees in order to allow the fitment of balance weights to dynamically balance the rotor 100.

Figure 2:
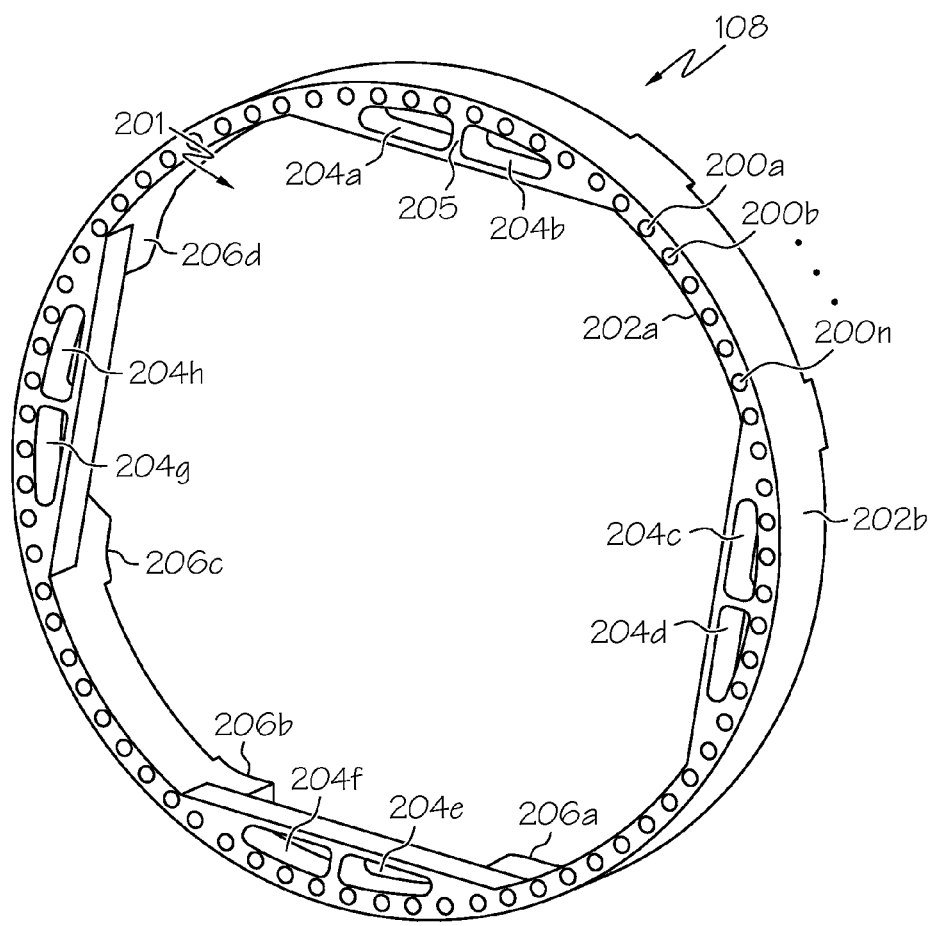
FIG. 2 is a perspective view of the balance ring of the rotor of FIG. 1A.

FIG. 2 is a perspective view of the balance ring 108 of the rotor 100 of FIG. 1A. The balance ring 108 may be circular in shape and of the same approximate outer circumference as the rotor core 300. The balance ring 108 may comprise a balancer 205 to balance the rotor. In an embodiment, the balancer 205 may include a plurality of balance holes 200a, b . . . n arranged around the balance ring 108. One or more of these balance holes 200a, b . . . n may receive a weighted insert 201. By placing weighted inserts 201 into specific balance holes, the balance ring 108 and balancer 205 may function to balance the rotor 100. Alternative embodiments of the balancer are contemplated and are considered to be within the scope of the invention. For example, a balancer may include material that may be removed from one or more locations around a balance ring.

Each balance hole 200a, b . . . n may extend partially into a first side 202a of the balance ring 108. A small hole (not shown) having a diameter smaller than each of the balance holes 200a, b . . . n may extend from the inside of each of the balance holes 200a, b . . . n through to the second side 202b of the balance ring 108. The small hole may prevent a weighted insert from hydrolocking inside one of the balance holes 200a, b . . . n. Further, the small holes in combination with the balance holes 200a, b . . . n may allow oil to pass through the balance ring 108.

The balance ring 108 may further include oil relief holes 204a-h. The oil relief holes 204a-h may allow oil to pass through the balance ring 108. In operation, oil deposits may build up in the rotor core 300. Oil flowing through the balance ring 108 may be desirable to drain oil deposits that build up in the rotor core 300.

The balance ring 108 may further include protrusions 206a-d. The protrusions 206a-d may extend from the balance ring 108 toward the rotor core 300. The protrusions 206a-d may extend upto the face of the rotor core. The protrusions 206a-d may prevent the balance ring 108 from moving axially toward the rotor core 300.

In the present embodiment, the balance ring 108 may be formed of titanium; however, other non-magnetic materials such as aluminum, non-magnetic steel or composites may be used.

FIG. 3 is a partially exploded view of the rotor 100 of FIG. 1A, the second portion 112b of the rotor can 110 being shown as exploded away from the first portion 112a of the rotor can 110. The rotor can 110 may be held in place with an interference fit directly over the rotor core 300 and balance ring 108. In an embodiment, the first portion 112a of the rotor can 110 and the second portion 112b of the rotor can 110 may be placed over the rotor core 300 by heating the first and second portions 112a and 112b of the rotor can 110 and then placing the first and second portions 112a and 112b of the rotor can 110 over the rotor core 300 while still hot. As the first and second portions 112a and 112b of the rotor can 110 cool, they may shrink thus resulting in an interference fit to the rotor core 300.

Figure 4:
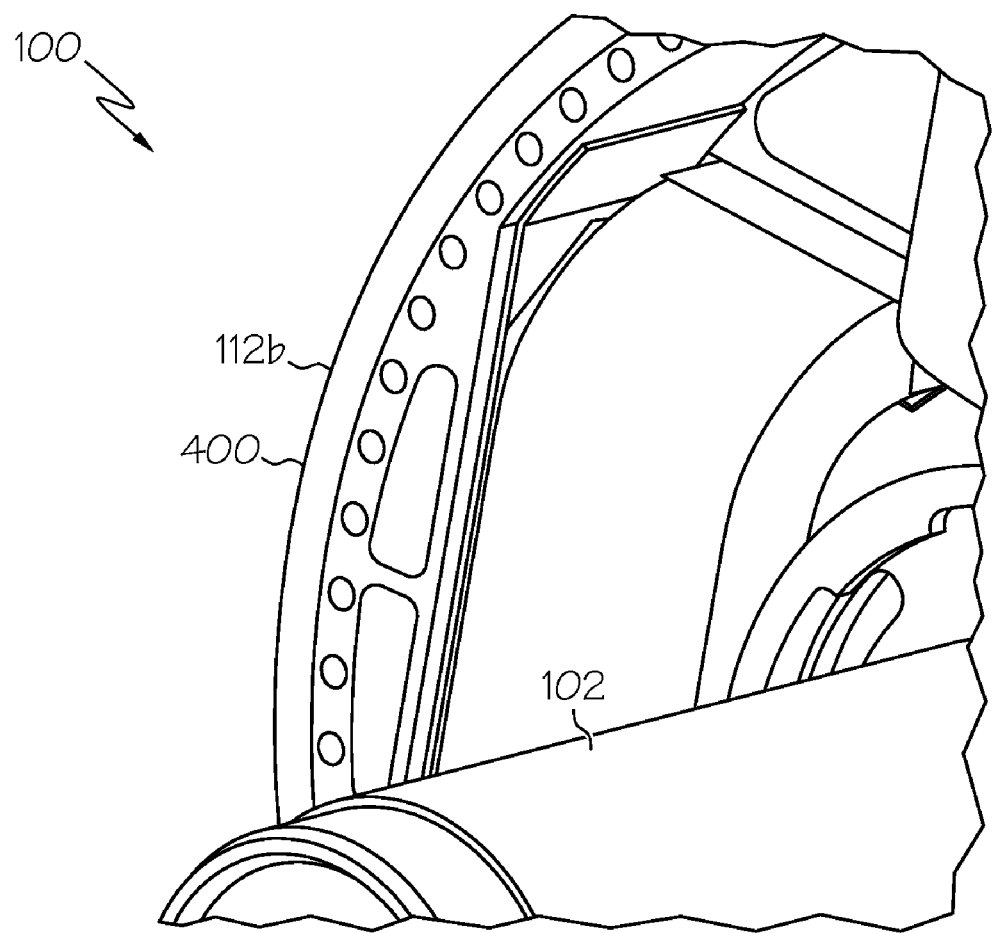
FIG. 4 is a close up perspective view of a portion of the rotor of FIG. 1A.

FIG. 4 is a close up perspective view of a portion of the rotor 100 of FIG. 1A. The second portion 112b of the rotor can 110 may include a lip 400 on the outboard end protruding inwardly towards the shaft 102. The balance ring 108 may be captured and held in place by the lip 400. Thereby, the lip 400 may prevent axial movement of the balance ring 108.

In the embodiment depicted in FIGS. 1-4, the rotor 100 may be approximately seven inches in length and approximately five inches in diameter. Rotors may also be formed in alternative physical sizes and configurations.

In the embodiment depicted in FIGS. 1-4, power generation of the rotor 100 may be approximately 150 kVA. Rotors may also have different power generation and output measures.

Figure 5:
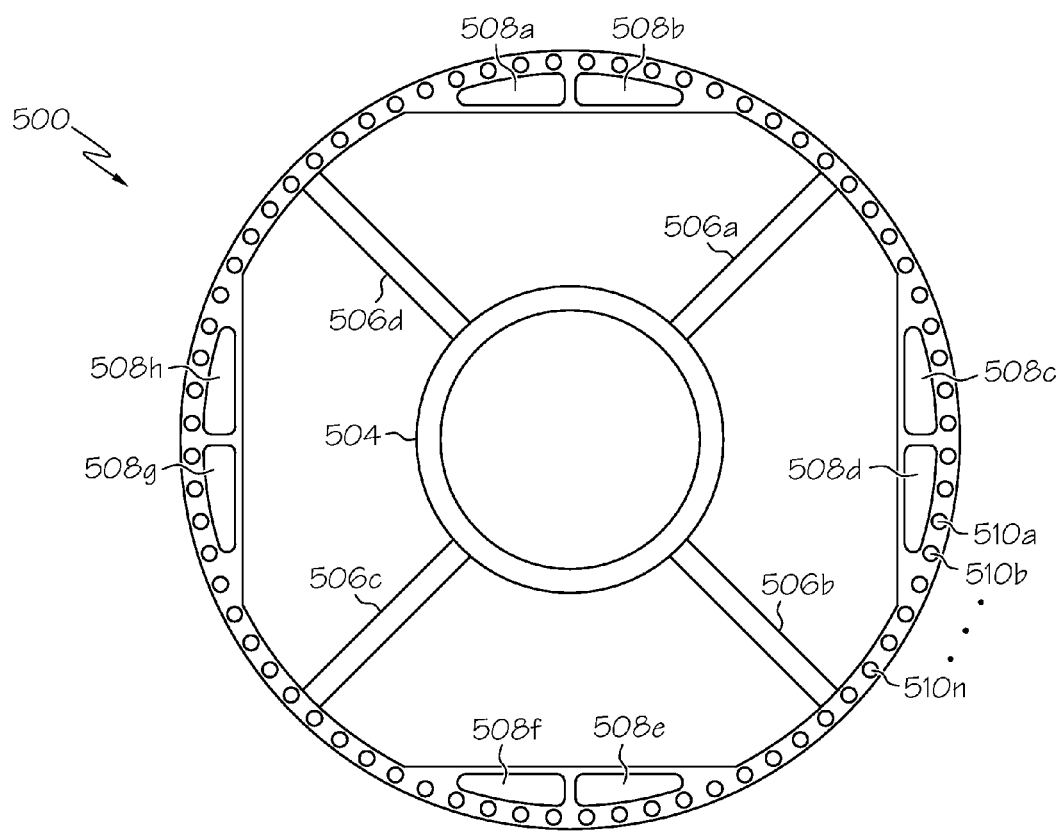
FIG. 5 is a front elevational view of a ring according to an alternative embodiment of the present invention.

FIG. 5 is a front elevational view of a balance ring 500 according to an alternative embodiment of the present invention. The balance ring 500 may include an outer portion 502, oil relief holes 508a-h, and balance holes 510a, b ... n. In the description of the embodiment of FIG. 5, redundant discussions of aspects of features similar to those already discussed are omitted for clarity.

The balance ring 500 may also include a shaft collar 504 and spokes 506a-d extending radially inward from outer portion 502 to the shaft collar 504. By using a shaft collar 504 and spoke 506a-d construction, the balance ring 500 may be restrained by the shaft instead of or in addition to being retained by a rotor can.

FIG. 6 is a schematic representation of a process 600 of fabricating a rotor of a generator, such as the rotor 100 of FIG. 1A, according to an embodiment of the present invention. A balance ring 108 may be mounted adjacent to a rotor core 300. A second portion 112b of a rotor can 110 may be heated 602 to a temperature such that expansion of the second portion 112b of the rotor can occurs. A balance ring 108 may be placed 604 into position against the rotor core 300, and held in place by appropriate tooling. The second portion of the rotor can may be pressed 606 onto the assembly while hot. As the second portion 112b of the rotor can cools 608, it may shrink resulting in an interference fit between the balance ring 108 and the second portion 112b, and between the rotor core 300 and the second portion 112b. Similarly, in an embodiment, a first portion 112a of the rotor can 110 may be heated to a temperature such that expansion of the first portion 112a of the rotor can 110 occurs. The first portion 112a of the rotor can 110 may be pressed over the rotor core 300. As the first portion 112a cools, it may shrink resulting in an interference fit between the rotor core 300 and the first portion 112a.

Weights to be located at one or more of a plurality of positions equally spaced around the balance ring 108 may be adjusted to balance the rotor. The adjusting of the weights may comprise inserting weighted inserts 201 into at least one of a plurality of balance holes 200a, b, ... n located at positions equally spaced apart from one another around the balance ring 108.

FIG. 7 is a schematic representation of a process 700 of balancing a rotor of a generator, such as the rotor 100 of FIG. 1A, according to an embodiment of the present invention. A balance ring 108 may be mounted, at step 702, adjacent to a rotor core 300. The balance ring 108 may be mounted by placing the balance ring 108 inside of a rotor can 110 wrapped around the rotor core and extending beyond an end of the rotor core.

Weights to be located at one or more of a plurality of positions equally spaced around the balance ring 108 may be adjusted, at step 704, to balance the rotor. The adjusting of the weights may comprise inserting weighted inserts 201 into at least one of a plurality of balance holes 200a, b, ... n located at positions equally spaced apart from one anther around the balance ring 108.

It should be understood, of course, that the foregoing relates to exemplary embodiments of the invention and that modifications may be made without departing from the spirit and scope of the invention as set forth in the following claims.

We claim:

1. A generator, comprising:
   a rotor core including a rotor; and
   a balance ring comprising a balancer including a weight, wherein the balance ring is secured by a press fit over the rotor core via a sleeve that is shrunk over both the rotor core and the balance ring.

2. The generator of claim 1, wherein the balancer comprises a plurality of balance holes in the balance ring, at least one of the plurality of balance holes to receive a weighted insert.

3. The generator of claim 2, wherein at least one of the plurality of balance holes is located in a first side of the balance ring and comprises a small hole extending from inside the balance hole out through a second side of the balance ring.

4. The generator of claim 2, wherein the plurality of balance holes are equally spaced apart from one another around the balance ring.

5. The generator of claim 1, further comprising a plurality of end turns wherein the balance ring supports the plurality of end turns.

6. The generator of claim 5, wherein the balance ring further comprises a protrusion extending from the balance ring towards the rotor core.

7. The generator of claim 1, wherein the balance ring further comprises an oil relief hole extending from a first side of the balance ring through the balance ring to a second side of the balance ring.

8. The generator of claim 1, wherein the generator further comprises four poles.

9. A generator, comprising:
   a rotor core including a rotor;
   a cylindrical balance ring press fit around a length of to the rotor core, the balance ring comprising a plurality of balance holes, positioned along a balance plane wherein the balance plane is defined relative to a shaft traveling through a center of the rotor core, at least one of the balance holes to receive a balance weight to balance rotation of the rotor; and
   a rotor can over the rotor core and the balance ring.

10. The generator of claim 9, further comprising a plurality of end turns wherein the balance ring supports the plurality of end turns.

11. The generator of claim 10, wherein the balance ring further comprises a protrusion extending from the balance ring to the rotor core.

12. The generator of claim 9, wherein the rotor can is secured to the rotor core and the balance ring by interference fit.

13. The generator of claim 9, wherein the rotor can comprises:
   a first portion; and
   a second portion including a lip,
   wherein the balance ring is secured in-between the lip and the rotor core.

14. The generator of claim 9, wherein the balance ring further comprises an oil relief hole extending through the balance ring.

15. The generator of claim 9, wherein at least one of the plurality of balance holes comprises a small hole extending from inside the balance hole out through a side of the balance ring opposite a side in which the plurality of balance holes are located.

16. The generator of claim 9, wherein the plurality of balance holes are equally spaced apart from one another around the balance ring.

17. The generator of claim 9, wherein the generator further comprises four poles.

* * * * *